United States Patent
Smith

(10) Patent No.: US 11,839,247 B2
(45) Date of Patent: Dec. 12, 2023

(54) GLOVES AND THE MANUFACTURE THEREOF

(71) Applicant: Detecetamet Limited, Pocklington (GB)

(72) Inventor: Sean Ronald Smith, Richmond, VA (US)

(73) Assignee: Detectamet Limited, Pocklington (GB)

( * ) Notice: Subject to any disclaimer, the term of this patent is extended or adjusted under 35 U.S.C. 154(b) by 498 days.

(21) Appl. No.: 16/683,446

(22) Filed: Nov. 14, 2019

(65) Prior Publication Data

US 2021/0085002 A1    Mar. 25, 2021

(30) Foreign Application Priority Data

Sep. 20, 2019   (GB) .................................. 1913591

(51) Int. Cl.
  *A41D 19/00*   (2006.01)
  *A41D 19/015*  (2006.01)

(52) U.S. Cl.
  CPC ....... *A41D 19/015* (2013.01); *A41D 19/0006* (2013.01)

(58) Field of Classification Search
  CPC .............. A41D 19/015; A41D 19/0062; A41D 19/0006
  See application file for complete search history.

(56) References Cited

U.S. PATENT DOCUMENTS

| 2004/0154072 A1 | 8/2004 | Connor |
| 2015/0020727 A1 | 1/2015 | Hull |
| 2016/0150840 A1* | 6/2016 | Enomoto ................ C08L 21/00 523/334 |
| 2019/0119474 A1* | 4/2019 | Tung .......................... C08J 5/02 |
| 2020/0199311 A1* | 6/2020 | Foo ............................. C08J 5/18 |

FOREIGN PATENT DOCUMENTS

| EP | 3663332 A1 | 6/2020 | |
| EP | 3778725 A1 * | 2/2021 | ............... C08K 3/08 |
| GB | 2372934 A | 9/2002 | |
| GB | 2438930 A | 12/2007 | |
| GB | 2555955 A | 5/2018 | |
| JP | 2014237786 A | 12/2014 | |
| WO | 2010089904 A1 | 8/2010 | |
| WO | 2013153390 A1 | 10/2013 | |
| WO | 2017170426 A1 | 10/2017 | |

* cited by examiner

*Primary Examiner* — Tajash D Patel

(74) *Attorney, Agent, or Firm* — GableGotwals

(57) ABSTRACT

A glove of a form typically, although not necessarily exclusively, provided for single or limited use purposes and discarded thereafter. The glove is to prevent contact between a product and a person's hand and to avoid contamination. The glove material includes components capable of detection by at least one form of noncontact detection apparatus which renders the glove or portion detectable if discarded and inadvertently becomes part of a manufacturing process or product. The components render the glove detectable by using metal detection apparatus and/or X-ray detection apparatus which may allow removal of the glove. The glove may also include an antimicrobial agent as part to prevent or reduced contamination on the surface of the glove. The glove can also be rendered biodegradable.

15 Claims, 1 Drawing Sheet

GLOVES AND THE MANUFACTURE THEREOF

CROSS-REFERENCE TO RELATED APPLICATIONS

This application claims priority to British Patent Application No. 1913591.2 filed Sep. 20, 2019 which is incorporated herein by reference.

BACKGROUND OF THE INVENTION

The invention to which this application relates is to the provision of gloves and in particular, although not necessarily exclusively, gloves which are provided to be used as a protective covering for a person's hand, when performing a work operation.

It is well-known that gloves can be used to provide a warming effect when worn on a person's hands in cold environments. It is also known to provide gloves in a form in which the same are relatively thin, typically formed of a rubber or plastics material and which form, when worn, a protective surface for a user's hand and also prevent contamination from the user's hands onto other articles.

The wearing of this latter type of glove had become compulsory in many industries and in particular, food and medicine preparation industries and, in general, in any industry where an article or product is being produced for human consumption.

It is found that by providing and requiring a user to wear relatively thinned walled gloves then the gloves are sufficiently thin and formed of a stretchable and pliable material such as rubber or plastic, so as to allow the user to still be able to manipulate their fingers and hands and perform the required work operations. At the same time, the wearing of the gloves prevent contamination from the user's hands and/or articles or objects which the user may wear such as rings, from reaching the food or other items which are being produced and in which the gloves come into contact.

Thus, while there are considerable advantages to wearing gloves and the advantages are sufficient so as to make the wearing of the gloves compulsory, there can be problems also created and these include the possibility of the glove or a portion of the glove from becoming separated from the users hands and entering the product which is being produced.

The presence of the dislodged glove or portion thereof in the product is, at the very least, off-putting to the end-user of the product should they become across the glove or dislodged portion and at the other end of the scale, can be hazardous to the end-user of the product should they swallow the glove or portion of the glove.

It is therefore known to provide as part of the material from which the glove is produced, a metal detectable material, typically in the form of magnetic metal particles which are provided in the material from which the glove is produced when the material is in a liquid form. The Applicant's patent GB2438930 describes such a process for producing gloves of this type.

Despite the existence of these form of gloves, it is still found that it is possible for the glove or portions thereof, to still be found to be present in the end product, at the time of use or consumption of the same so that during the production process, the presence of the glove or portion thereof, has not been detected and removed and/or the product destroyed. In the ever increasingly litigious environment, the presence of the glove or portion thereof, in addition to providing a risk to the health of the end-user of the product, can lead to significant costs and damages being incurred by the producer of the product in which the glove or portion thereof is found.

BRIEF SUMMARY OF THE INVENTION

The aim of the present invention is therefore to provide a glove which has an increased reliability in terms of the ability to identify the presence of the glove or a portion thereof in a product so as to allow the removal of the same and/or destruction of the product in which the same is found prior to the product reaching the end consumer.

In a first aspect of the invention, there is provided a glove, said glove formed so as to be located round the palm, back and fingers of a user's hand, said glove formed of a sheet material which is sufficiently pliable so as to allow the manipulation of the users hand without any substantial restriction and wherein the said sheet material includes therein one or more components so as to render the glove, or portions thereof, detectable by non-contact detection apparatus.

In one embodiment the glove includes components therein to allow the same to be rendered detectable by X-ray detection apparatus and metal detection apparatus.

In one embodiment, at least one of the components is provided in the form of particles which are dispersed in the material from which the glove is formed when in a liquid condition.

In one embodiment, both the component which is detectable by X-ray apparatus and metal detection apparatus is provided in the form of particles.

In one embodiment, when provided, the components are provided in a powder form.

In one embodiment, one or both of the metal or X-ray detectable components, is formed and provided as a liquid which is added to the material from which the glove is formed, when in a liquid condition.

In one embodiment, the component which is detectable by the metal detection apparatus, is a magnetically attractive metal or metal alloy.

In one embodiment there is provided a glove which includes an evenly dispersed quantity of a magnetically detectable component and X-ray detectable component in particulate form.

The electro-magnetically and X-ray detectable components are preferably provided in powder form, the average particle size of the powder preferably being between 1 and 200 microns. Typically, the average particle size is in the range 50 to 200 microns, preferably between 50 to 100 microns.

The electro-magnetically detectable component is preferably a ferrous material, more preferably ferrous oxide typically comprising $YFe_2O_3$. The component may consist solely of a single metallic substance e.g. a ferromagnetic or ferromagnetic material, or it may comprise a mixture of two or more different electro-magnetically detectable component including an iron-containing powder. In addition, or alternatively, the component may include a bronze alloy of copper with aluminium, manganese or beryllium. The alloy may be an alloy of copper and tin and may include other metals such as zinc or lead.

In one embodiment, the component which is detectable by the X-ray detection apparatus is barium.

In one embodiment, the said metal and X-ray detectable components are added to the material from which the sheet material glove is formed, in a manner so as to allow the same to be substantially uniformly dispersed into the material prior to the formation of the glove therefrom.

In one embodiment, the portion or portions of the glove which are most susceptible to be detached form the remainder of the glove during use of the same, are determined and the metal and/or X-ray detectable components, is provided with a greater density at said locations of the glove so as to increase the possibility of the said portions being detected, if they are detached from the glove.

In one embodiment, the said greater density is achieved, by adding the said metal and/or X-ray detectable components as a coating on the said portions, and in addition to the metal and/or X-ray detectable components which may already be included within the sheet material from which the glove is manufactured.

In one embodiment the glove includes an antimicrobial agent within the wall of the glove and/or at the surface thereof.

In one embodiment the antimicrobial agent is added as a powder to the other ingredients when in a fluid condition in a reservoir and prior to forming the glove.

In one embodiment the antimicrobial agent includes ionic silver particles which are added during the manufacturing process for the glove so that the antimicrobial agent is impregnated throughout the wall of the glove and thereby provides a substantially continuous reduction of the presence of any contaminating microbes by binding with and damaging microbe cells with which the gloves come into contact.

In addition or alternatively the antimicrobial agent is or includes a photosensitizer so as to be activated by exposure of the glove to light and/or oxygen, typically when the glove is being worn in use.

In one embodiment the glove is biodegradable which is an important characteristic when one considers that in many instances the gloves are provided for single use purposes and are discarded after use. Conventionally these gloves would add to the problem of waste generation.

However by rendering the same biodegradable so they can be dealt with in a managed and environmentally beneficial manner.

BRIEF DESCRIPTION OF THE DRAWINGS

Specific embodiments of the invention are now described with reference to the accompanying drawings; wherein.

DETAILED DESCRIPTION OF THE INVENTION

Electro-magnetic and/or X-ray inspection of products leaving a production line is typically undertaken as a matter of course in many industries. Such inspections enable metal-based foreign bodies present in otherwise non-metallic products to be detected. In this way, contaminated products can be selectively discarded. However, gloves worn by workers to protect the product from contamination are generally produced from a polymetric substance (e.g. a plastisol) or a nitrile rubber and so that the presence of the glove, or a fragment thereof, in a product such as a foodstuff, or pharmaceutical would not be detectable other than as a result of visual inspection of the product and, as such there is a significant risk of contamination.

The present invention therefore provides a glove for use by operatives on, for example, manufacturing production lines, and in order that the presence of the glove in the manufacturing process and/or in the manufactured product can be detected electro-magnetically and via X-ray or other non contact detection apparatus in the event that the glove, or a portion of the same, becomes inadvertently removed from the operative's hand and falls into or onto the products during the manufacturing process.

Figure 3:
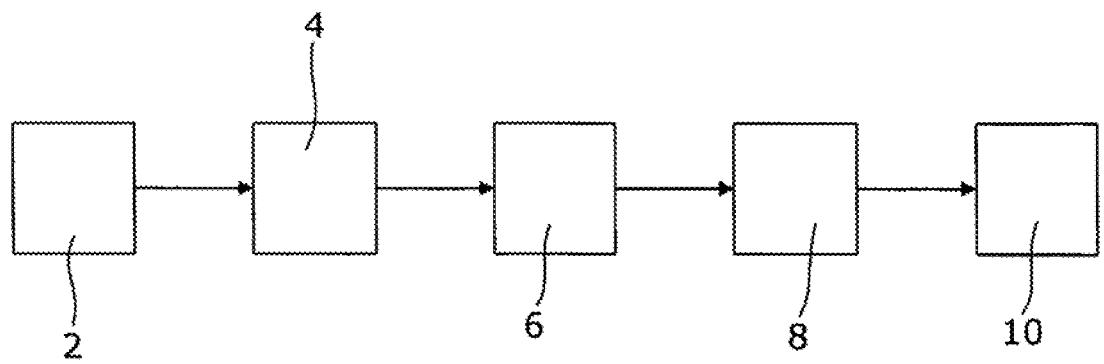
FIG. 3 illustrates the method steps for forming a glove in accordance with one embodiment of the invention.

Referring to FIG. 3 the glove is produced from a plastic material such as a plastisol such as a natural latex, acrylonitrile-butadiene (nitrite) or polyvinylchloride (pvc). The liquid may also include various additives such as stabilisers, accelerators and fillers and an antimicrobial agent and preferably the end mixture of the materials is such as to be biodegradable. The material from which the glove walls are to be formed is initially held in a liquid form 2 and into which, in accordance with the invention, components in the form of electro-magnetic particles 4 are added and X-ray detectable components 6 are added. Typically, these components are added and mixed so as to be substantially uniformly dispersed in the liquid material and, if required, the mixing means can be provided to ensure that this occurs and is maintained whilst the material is waiting to be used to form the gloves.

The electro-magnetically and/or X-ray detectable components are preferably mixed with the liquid plastisol material to produce a relatively homogenous mix and the quantity of the components added preferably represents between 3% and 6% by volume of the mix. Typically, the quantity is of the order of 5%-10% by volume in total.

When the components are added in a powder form, the particle size of the majority of the powder is preferably below 200 microns and would usually be above 1 micron. More preferably the particle size of the majority of the powder is in the range 50 to 200 microns and most preferably is in the range 50 to 100 microns.

Figure 1:
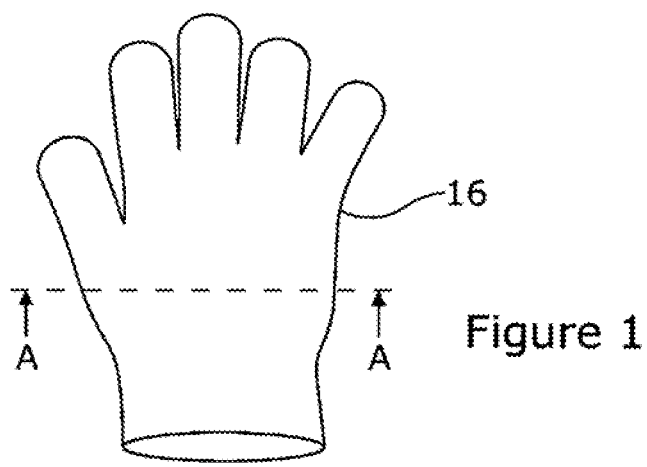
FIG. 1 illustrates a glove formed in accordance with the invention.
Figure 2:
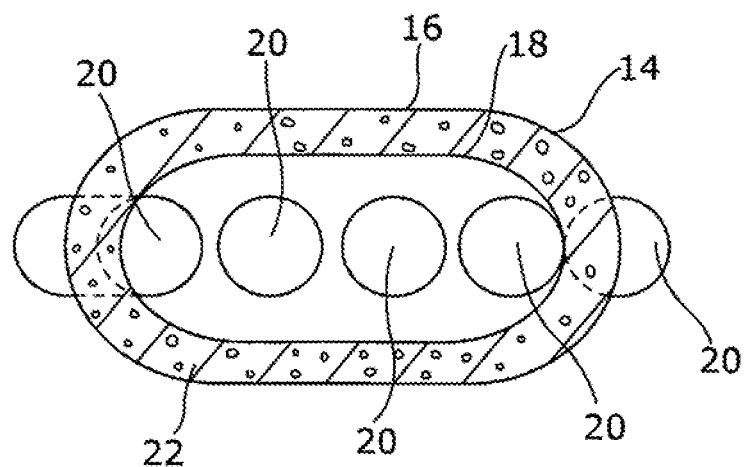
FIG. 2 illustrates a cross section through the wall of the glove along line A-A.

Typically, the gloves are produced by a process in which a glove-shaped former is immersed for a relatively short period of time in the liquid material and a quantity of the liquid material is then carried on the former and is allowed to cool and harden and removed from the former so that the hardened material forms the wall of the glove at step 10, and an example of which is shown in FIGS. 1 and 2, with the glove having a relatively thin wall 14 which defines the outer surface 16 and inner surface 18 of the glove and the cavities 20 into which the user's fingers are placed.

When the glove is worn it is found that the presence of the electro-magnetically and/or X-ray detectable components 22 within the glove material is in a sufficient density so as to activate detection equipment on the production line of the products so that if a glove or even a relatively small portion of the glove is present in manufactured products leaving a production line then the same is detected by the detection apparatus, production can be stopped and steps taken to destroy contaminated products and retrieve the glove or glove portion.

The invention claimed is:

1. A glove, said glove formed so as to be located round the palm, back and fingers of a user's hand, said glove formed of a sheet material which is sufficiently pliable so as to allow the manipulation of the users hand without any substantial restriction and wherein the said sheet material includes therein a plurality of components so as to render the glove, and detached portions thereof, detectable by non-contact detection apparatus in the form of X-ray detection apparatus and metal detection apparatus, wherein the plurality of components include a quantity of magnetically attractive metal or metal alloy particles to render the particles detectable by the metal detection apparatus and a quantity of barium and/or a ferrous oxide including YFe2O3 to render the particles detectable by the X-ray detection apparatus and the plurality of components are substantially uniformly dispersed throughout a base material used to form the glove when the base material is in a liquid form so as to retain the plurality of components within the wall of the glove once the glove is formed from the base material and worn.

2. A glove according to claim 1 wherein said plurality of components are provided in the form of particles which are dispersed in the material from which the glove is formed when in a liquid condition.

3. A glove according to claim 2 wherein said particles are added to the other ingredients of the material used to form the glove when in a liquid condition.

4. Apparatus according to claim 3 wherein, the said particles are provided in a powder form.

5. Apparatus according to claim 3 wherein a further one of said plurality of components is formed and provided as a liquid.

6. Apparatus according to claim 4 wherein, when provided in a powder form, the average particle size is within the range of 1-200 microns.

7. A glove according to claim 6 wherein the average particle size is in the range of 50-200 microns.

8. A glove according to claim 7 wherein the average particle size is in the range of 50-100 microns.

9. Apparatus according to claim 1 wherein the electromagnetically detectable material includes a bronze alloy of copper with aluminium, manganese and/or beryllium.

10. A glove according to claim 1 wherein the portion or portions of the glove which are more susceptible to be detached from the glove during use of the glove are determined and the said plurality of components are provided with a greater density at said locations on the glove than at other portions of the glove.

11. A glove according to claim 10 wherein the said greater density of the said plurality of components is achieved by adding said plurality of components as a coating on the said one or more portions of the glove.

12. Apparatus according to claim 11 wherein the said coating is added in addition to the said plurality of components already included within the sheet material from which the glove is manufactured.

13. A glove according to claim 1 wherein the glove includes an antimicrobial agent within the walls of the glove and/or at the surface thereof.

14. A glove according to claim 13 wherein the antimicrobial agent is added as a powder along with the said plurality of components to the material in a liquid condition used to form the glove.

15. A glove according to claim 1 wherein the glove is biodegradable once the glove has been discarded after use.

* * * * *

UNITED STATES PATENT AND TRADEMARK OFFICE
CERTIFICATE OF CORRECTION

| | | |
|---|---|---|
| PATENT NO. | : 11,839,247 B2 | |
| APPLICATION NO. | : 16/683446 | |
| DATED | : December 12, 2023 | |
| INVENTOR(S) | : Sean Ronald Smith | |

It is certified that error appears in the above-identified patent and that said Letters Patent is hereby corrected as shown below:

On the Title Page

1. Item (71) Applicant name should be corrected to "Detectamet Limited"

In the Claims

2. In Claims 4, 5, 6, 9, and 12, "Apparatus" should be corrected to "A glove"

Signed and Sealed this
Fifth Day of March, 2024

Katherine Kelly Vidal
*Director of the United States Patent and Trademark Office*